May 4, 1954  S. S. DABROWSKI  2,677,275
ELECTROMAGNETIC METHOD OF TESTING ADHESIVE QUALITIES
OF PAINTS, LACQUERS, AND THE LIKE
Filed Nov. 17, 1951
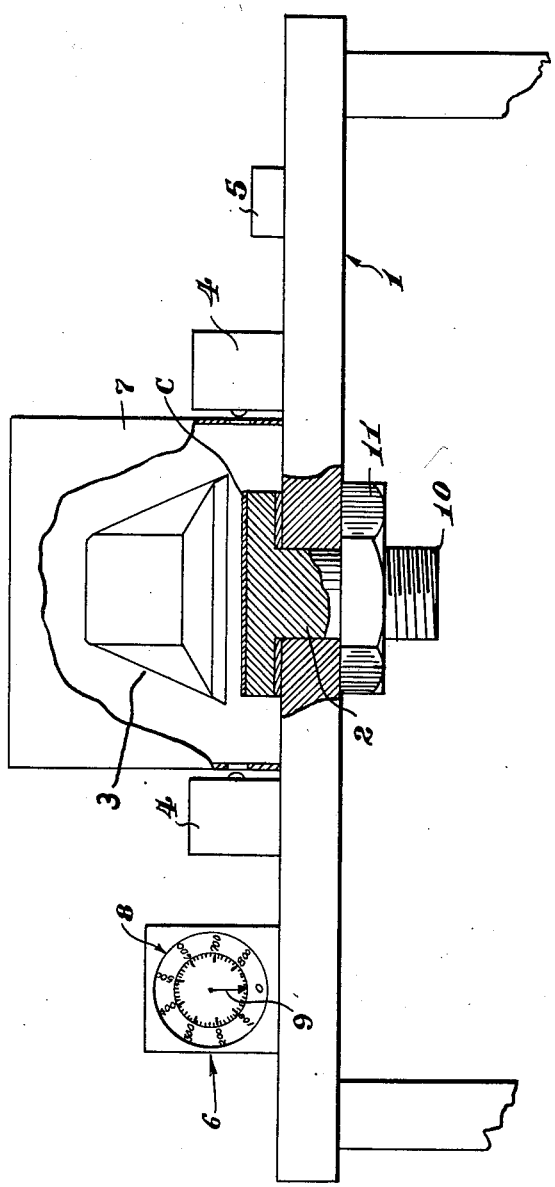
INVENTOR
Sigmund S. Dabrowski Patented May 4, 1954

2,677,275

UNITED STATES PATENT OFFICE 2,677,275

ELECTROMAGNETIC METHOD OF TESTING ADHESIVE QUALITIES OF PAINTS, LACQUERS, AND THE LIKE

Sigmund S. Dabrowski, Summit, Ill.

Application November 17, 1951, Serial No. 256,956

3 Claims. (Cl. 73—150)

This invention relates to a method for testing coating materials, and more particularly to an electromagnetic method of testing adhesive qualities of coating material such as paints, lacquers and the like.

Heretofore, it has not been possible to accurately test or measure the adhesive qualities of paints, lacquers, and the like. That is, although the testing of most of the characteristics of various paints or lacquers is a highly developed art, nevertheless, the quantitive or accurate testing of the adhesive qualities of paint or lacquer has not been previously accomplished.

It is, therefore, an object of the present invention to provide an efficient method of testing the adhesive qualities of paint and other similar materials.

More particularly, an object of the invention is to provide an electromagnetic method of testing the adhesive qualities of paints, lacquers and the like, wherein a predetermined quantitty of a finely divided ferromagnetic substance such as fine, soft iron powder is intermixed with the paint, varnish or the like that is to be tested, and then the paint is applied to various articles, such as wood, plastic, metal or other material, and then allowed to dry, and thereafter a suitable magnet is arranged contiguous to the painted surface to effect a pulling force against the iron powder in the paint.

One illustrative practice of the invention is to provide an electromagnetic method of testing the adhesive properties of paint, lacquers or other similar compounds, the method including the steps of mixing soft iron powder with the paint, then applying the paint to various materials, permitting the paint to dry, and next arranging an electromagnet contiguous to the painted surface, the force necessary to pull the paint loose from the material adapted to be measured in electrical units or values, so that a quantitative and accurate method of measuring the adhesive qualities of the paint or lacquer is provided.

A further object of the invention is to provide a simple and inexpensive method of testing the adhesive qualities of paint, lacquer and the like.

Other objects and advantages will be apparent during the course of the following description.

The single view is an elevational view, with parts broken away and in section, showing illustrative means for practicing the method of the present invention.

According to the method of the present invention, fine, soft iron powder is added to the paint or varnish that is to be tested. The soft iron powder may be approximately 15 to 20 per cent of the quantity of paint or varnish with which it is mixed, and the iron powder and paint are thoroughly and evenly mixed in any suitable manner.

Next, paint or varnish or other material is applied in any suitable manner to various materials, such as wood, plastic, metal or other objects and is permitted to dry. After the paint has dried, the wood, plastic or metal object is securely fastened in place by any suitable means, in order to insure that this object does not move. Next, a conventional electromagnet is applied or arranged contiguous to the paint coating, that is, the electromagnet is applied a short distance above the paint coating. Thus, the magneto-motive force of the electromagnet will exert its pulling force against the iron powder in the paint or varnish. Since the strength of the magneto-motive force created in the electromagnet is directly proportional to the amount of current used, the force necessary to pull the paint, lacquer, varnish or other material from the immobile object can be measured in electrical values by electrically connecting a suitable gauge to the electromagnet.

Although it has previously been stated that the soft iron powder is approximately 15 to 20 per cent of the quantity of paint or lacquer with which it is mixed, it is to be understood that I do not wish to restrict the invention to any exact proportions. Referring in detail to the drawing, the numeral 1 designates a suitable bench or table top which may be constructed of non-magnetic material and the bench or table top 1 serves as a support for the various components or instruments. The present invention is adapted to be used for testing the adhesive qualities of paints, enamels, varnishes and the like by coating various materials with the paints, varnishes and the like, the coating material having been previously mixed with a small amount of iron powder and after which it is subjected to a force (E. M. F.) of an electro-magnet. The numeral 2 designates a specimen which may be made of various materials and the support member or specimen 2 may be provided with an exteriorly threaded shank 10 which is adapted to be engaged by a suitable securing element such as a nut 11 whereby the support member or specimen 2 will be maintained immobile in place on the table 1. Thus, the various coatings indicated by the letter C are applied to the specimen 2, and the member 2 is of a sufficient thickness to forestall any bending or distortion under the force of the electromagnet.

There is further provided an electro-magnet 3 which is adapted to be used for pulling the coating C away from the member 2. A pair of photoelectric cells 4 are arranged in opposed relation with respect to each other, and the beam of the photo-electric cells 4 is interposed between the coated specimen 2 and the electro-magnet 3 so that when the particles of the coating are pulled from the material specimen 2, there will be an interruption of the beam so that the current will cut-off. This will cause a solenoid or relay 5 to open to thereby cut-off the current to a recording device 6.

The numeral 7 designates a shield which is arranged so that it will completely enclose the specimen being tested as well as enclose the electro-magnet 3 to thereby insure that the instrument will operate accurately. The shield 7 is made of a non-magnetic material. The recording device 6 is in effect a volt-meter but in lieu of using an indicating hand, an inking stylus or pen arm 9 is provided, the pen arm 9 being similar to those used in humidity and temperature recording devices. A paper card or chart 8 is properly calibrated in electrical values, and an individual card is used for every test so that an accurate and positive record of each and every test is provided.

The operation of the apparatus shown in the drawing, is as follows. Paint or any other coating C to be tested is applied to the material specimen 2 and permitted to dry. Then, the specimen 2 is fastened to the table or bench 1 in any suitable manner, as for example by means of the nut 11. Then, electric current is applied gradually by means of a rheostat to the electromagnet 3 until a sufficient force (E. M. F.) great enough to pull the coating C away from the material is provided. As the coating C breaks away from the specimen 2, it interrupts the beam of the photoelectric cells 4 to thereby break the current to the relay 5 causing the relay 5 to open and break the current to the indicator 6. Simultaneously, as current is applied to the electromagnet 3, the pen arm 9 is moving and tracing a line across the card 8 in direct proportion to the amount of current applied, and when the beam of the photo-electric cells 4 is interrupted by the coating particles to thus break the current, the pen arm 9 stops at the same instance the particles break away.

What is claimed is:

1. An electromagnetic method of testing the adhesive qualities of coating materials comprising the steps of adding iron powder to the coating materials, then applying the coating materials to a body and permitting the coating materials to dry, then fastening the body to make it immobile, next arranging an electromagnet contiguous to the coating materials, whereby the magneto-motive force of the electromagnet exerts a pulling force upon the iron powder in the coating materials, and measuring the current necessary to generate the magneto-motive force which pulls the coating material from said body as an index of the adhesive quality of the coatings.

2. An electromagnet method of testing the adhesive qualities of coating materials comprising the steps of adding 15 to 20 percent by volume of a fine, soft iron powder to the coating materials, then applying the coating materials to a body, permitting the coating materials to dry, then fastening the body to make it immobile, then arranging an electromagnet contiguous to the coating materials whereby the magneto-motive force of the electromagnet exerts its pulling force upon the iron powder in the coating materials, and measuring the current necessary to generate the magneto-motive force which pulls the coating material from said body as an index of the adhesive quality of the coatings.

3. An electromagnetic method of testing the adhesive qualities of a coating material, characterized by the steps of, mixing a finely divided ferromagnetic substance with the coating material, applying the material to a body, arranging an electromagnet adjacent to the material, fastening the body to make it immobile with respect to the electromagnet, applying an electric current to the magnet whereby the magneto-motive force of the electromagnet exerts a pulling force upon said substance in the coating material, and measuring the current necessary to generate the magneto-motive force which pulls the material from said body as an index of the adhesive quality of the material.

References Cited in the file of this patent

UNITED STATES PATENTS

| Number | Name | Date |
|---|---|---|
| 2,035,475 | Hay | Mar. 31, 1936 |
| 2,570,856 | Pratt et al. | Oct. 9, 1951 |
| 2,584,318 | Allyn | Feb. 5, 1952 |